Nov. 22, 1927.  
S. SIEGEL  
1,650,395  
FIXED CAPACITY CONDENSER AND METHOD FOR MAKING THE SAME  
Filed April 14, 1925
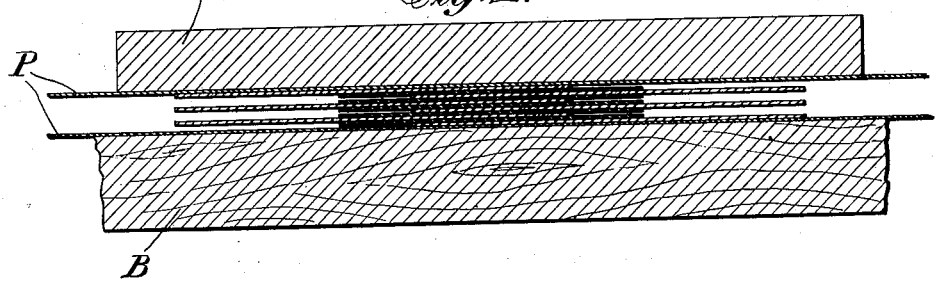
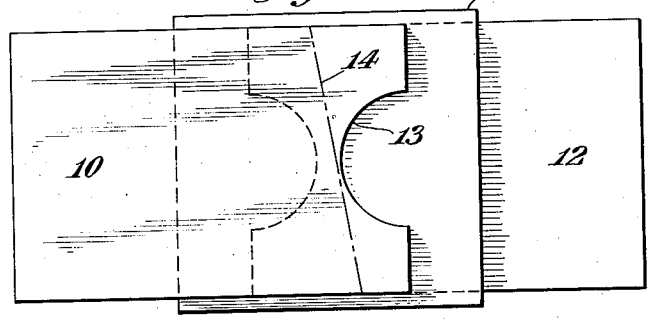
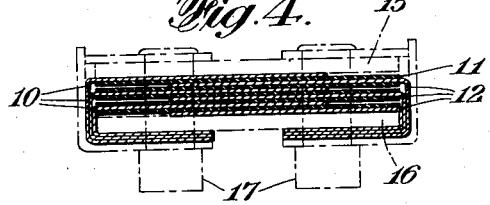
Inventor  
Samuel Siegel  
By his Attorneys  
Dean, Fairbank, Obright & Hirsch.

Patented Nov. 22, 1927.

1,650,395

UNITED STATES PATENT OFFICE.

SAMUEL SIEGEL, OF NEW YORK, N. Y., ASSIGNOR TO AEROVOX WIRELESS CORPORATION, A CORPORATION OF NEW YORK.

FIXED CAPACITY CONDENSER AND METHOD FOR MAKING THE SAME.

Application filed April 14, 1925. Serial No. 22,933.

This invention relates to electrical condensers of the plate or sheet type in which the successive layers of metal foil or other conducting material are connected to alternate terminals and are separated by layers of a dielectric, such as mica.

The ordinary condensers of the fixed capacity type commonly employed in radio apparatus are rated according to standard units of capacity measurement, as for instance, in thousandths of a microfarad. The capacity of the condenser varies as the effective area of the metal plates and inversely as the distance between the plates and therefore, the variation in the thickness of the sheets of mica very materially affects the capacity even though the number and area of the plates remain constant. In commercial manufacture, it is difficult, if not impossible to have the mica plates of absolutely uniform thickness and even though the greatest precaution is taken in sorting the mica to one-half thousandths of an inch, the same number of layers in two similar condensers will not give the same capacity. The method commonly employed in the manufacture of a fixed condenser, is to build it up with the standard number of conducting and insulating plates of standard size and after completion to test it for capacity and label it as of the nearest standard unit. Different condensers of apparently identical construction may vary as much as 20% to 30% above or below the average capacity of a condenser of the given size and character.

An important object of my invention is to control the capacity and bring it to a fixed standard during the process of manufacture so that all of the condensers having a given capacity rating will come within very narrow limits of the same exact capacity. In carrying out my invention, the plates are assembled as a distinct and separate unit capable of being handled and tested prior to assembly in its protective enclosure. After the testing and before the final assembling operation, the capacity of the condenser is varied to bring it to the desired standard, this being accomplished by removing a part of the outer or top conducting plate or, if necessary, one or more of the conducting and insulating plates. After the pack or condenser unit has been brought to the desired predetermined standard, the assembling operation may thereafter be completed by applying the protective enclosure and terminals.

The pack is formed preferably by uniting the alternate conductive and dielectric plates by binding with a thin film of paraffine or the like, applied preferably by dipping the plates to form the pack in molten paraffine and extruding the excess by the application of moderate pressure and heat. The resulting pack is substantially invariant in capacity and is not subject to change during testing, handling and application of the protective enclosure and the terminals.

In the accompanying drawings, I have illustrated somewhat diagrammatically and on a greatly enlarged scale, one embodiment of my invention and indicated the manner in which my improved method may be carried out.

In these drawings,

Figure 1 is a transverse section through the condenser pack or unit before compression, Figure 2 is a similar section showing the parts compressed and connected, Figure 3 is a top plan view of the pack or unit, Figure 4 is a section through the complete condenser, the housing parts and terminals being shown in dotted lines.

The desired number of conducting plates of the desired size are assembled with the desired dielectric or insulating plates therebetween. The conducting plates are preferably of metal foil, such as tin foil and the dielectric or insulating plates are preferably of mica, although other materials might be suitable for the purpose in special types of condensers. In assembling, each alternate conducting plate 10 is so placed that a portion thereof extends beyond the insulating plates 11 at one end and the remaining conducting plates 12 extend beyond the insulating plates at the other end. Each set of conducting plates has a semi-circular recess or notch 13 at its inner end so that the pack may later be connected by rivets or other equivalent elements adjacent to opposite ends, one rivet being spaced from one set of conducting plates and extending through the other set while the other rivet is spaced from the last mentioned set and extends through the first mentioned one. This feature taken by itself is not my invention, and it will be evident that various other shapes of plates and relative positionings might be employed to produce the desired result, namely the complete insulation of each conducting plate from the adjacent ones upon opposite sides thereof and the connecting of the alternate conducting plates in one group and the intermediate conducting plates in a second group, the two groups being adapted to be connected to opposite terminals.

After the assembly of the plates, the pack is dipped in paraffine or other suitable insulating material of low melting point which will freely enter the spaces between the adjacent plates and which will harden when cold to hold all of the plates in fixed relationship. At the time of the dipping, the several plates held in an appropriate fixture (not shown) will admit paraffine in the small spaces therebetween as shown on exaggerated scale in Figure 1. Instead of dipping the pack, after assembly, each individual plate might be dipped before the assembly to give it a coating of the paraffine.

After the assembly of the plates, with the paraffine or other equivalent insulating material therein, the pack is subjected to moderate heat and pressure to melt the paraffine and cause all of the excess paraffine to be extruded, leaving a minimum amount in the form of a film between each element of the pack and the next one, which serves to hold or bind the conducting and insulating plates together in a single unit, and to give it sufficient strength and rigidity to permit of handling and testing and assembling into the complete condenser without liability of affecting the capacity. Any suitable means may be employed for applying the heat and pressure. I have illustrated somewhat conventionally in Figure 2 a platform B upon which a plurality of the packs are placed, pressure and heat being applied by a heated plate or roller A passed over said packs. Sheets of paper P are preferably interposed between the support and the packs and between the packs and the heated plate or roller. Of course, if desired the support A may be heated in addition to or instead of the pressure plate or roller.

After the assembly described, the unit is tested to determine its capacity, preferably such a number of plates of such size being originally used as will give a capacity somewhat in excess of the desired predetermined amount. Thereafter, the total effective area of the conducting plates is reduced, preferably a little at a time, until the testing of the unit shows that it has substantially the exact desired capacity. This reduction in the effective plate area may be accomplished by cutting off small portions of the upper conducting plate, for instance by running a knife across the same, but without sufficient pressure to cut through the upper mica plate or disturb the fixed spacing of the plates therebeneath. Merely as an example, I have indicated in Figure 3 a line 14, and along which the end portion of the upper plate 10 may be cut before removing the cut off portion. In some special cases, it may be necessary to remove the entire upper plate 10, the upper mica plate 11 and a portion of the next conducting plate 12.

When the total effective plate area has been reduced to the desired amount, the unit or stack is thereafter preferably permanently armored, encased or housed and provided with suitable terminals. The specific form of housing forms no essential portion of my present invention but it may include upper and lower bakelite or other insulation plates 15 and 16, indicated in dotted and dash lines in Figure 4, and these together with the intermediate pack may be connected by rivets or two separate binding posts 17 engaging with the separate bent over ends of the sets of conducting plates 10 and 12. A preferred backing plate and terminal construction is shown in the copending application of Samuel I. Cole, Serial No. 20,031 filed April 2, 1925.

It may be noted that the preformed pack is substantially incompressible since it includes but thin sheets of foil and mica, and films of paraffine. In the preferred mode of applying the enclosure and terminals, little or no pressure is exerted on the stack, and accordingly no change in capacity can result from such assembly. As a matter of fact the capacity will remain substantially unchanged even under substantial compression.

It will thus be seen that there is herein described apparatus and a method in which the several features of this invention are embodied, and which attain the various objects of the invention and are well suited to meet the requirements of practical use.

As many changes could be made in the above apparatus and a method, and many apparently widely different embodiments of this invention could be made without departing from the scope thereof, it is intended that all matter contained in the above description or shown in the accompanying drawings shall be interpreted as illustrative and not in a limiting sense.

Having thus described my invention what I claim as new and desire to secure by Letters Patent is:

1. The method of making a condenser of fixed and predetermined capacity which includes forming a pack of alternately arranged conducting and insulating plates with an auxiliary binding material of low melting point between the adjacent plates, applying heat and pressure to remove the major portion of said last mentioned material leaving only a film between said plates to hold them in fixed relationship, said pack being of larger capacity than the magnitude desired, testing to determine the capacity of the pack and reducing the effective conducting area of an outer plate to bring the capacity to the predetermined magnitude.

2. The method of making a condenser of predetermined capacity which consists in assembling a pack of alternately arranged conducting and insulating plates, dipping the pack in paraffine, applying heat and pressure to remove a portion of the paraffine and to connect said plates by the remaining paraffine, said pack being of larger capacity than the desired capacity, testing the pack to determine the capacity, and stripping off a portion only of the outer conducting plate to reduce the capacity to the predetermined standard.

3. The method of making a condenser unit of fixed and predetermined capacity which consists in assembling a pack of alternately arranged conducting and insulating plates, each alternate conducting plate being adapted for connection to one terminal and the intermediate conducting plate being adapted for connection to another terminal, connecting said plates in fixed relationship, to form a condenser of higher capacity than the predetermined capacity, testing the condenser to determine the capacity and reducing the capacity to the predetermined amount by reducing to the required extent the effective conducting area of an outer plate of the pack and thereafter housing said pack and attaching terminals to said plates.

Signed at New York city in the county of New York and State of New York this 13th day of April, A. D. 1925.

SAMUEL SIEGEL.